US012771949B2

(12) United States Patent
Martin et al.

(10) Patent No.: US 12,771,949 B2
(45) **Date of Patent: *Oct. 20, 2026**

(54) SYSTEMS AND METHODS OF ELIMINATING VIDEO FLICKER CAUSED BY LED DUTY CYCLING TO MAINTAIN BRIGHTNESS AND CONTROL POWER CONSUMPTION

(71) Applicant: Tyco Fire & Security GmbH, Neuhausen am Rheinfall (CH)

(72) Inventors: Walter A. Martin, Ballymena (GB); Terry Neill, Lisburn (GB)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 126 days.

This patent is subject to a terminal disclaimer.

(21) Appl. No.: 18/778,664

(22) Filed: Jul. 19, 2024

(65) Prior Publication Data

US 2024/0373132 A1 Nov. 7, 2024

Related U.S. Application Data

(63) Continuation of application No. 18/229,438, filed on Aug. 2, 2023, now Pat. No. 12,047,688, which is a
(Continued)

(51) Int. Cl.
*H04N 23/745* (2023.01)
*H04N 23/71* (2023.01)
*H04N 23/73* (2023.01)

(52) U.S. Cl.
CPC ........... *H04N 23/745* (2023.01); *H04N 23/71* (2023.01); *H04N 23/73* (2023.01)

(58) Field of Classification Search
CPC ....... H04N 23/745; H04N 23/71; H04N 23/73
(Continued)

(56) References Cited

U.S. PATENT DOCUMENTS

| | | | |
|---|---|---|---|
| 8,964,062 | B1 | 2/2015 | Neglur |
| 2003/0107664 | A1 | 6/2003 | Suzuki |

(Continued)

FOREIGN PATENT DOCUMENTS

| | | | |
|---|---|---|---|
| EP | 3 099 058 | A1 | 11/2016 |
| JP | 3718243 | B2 | 11/2005 |
| WO | WO-2018/051615 | A1 | 3/2018 |

OTHER PUBLICATIONS

European Office Action on EP Appl. No. 19155620.8 dated Nov. 25, 2021 (10 pages).

(Continued)

*Primary Examiner* — Lin Ye
*Assistant Examiner* — Chan T Nguyen
(74) *Attorney, Agent, or Firm* — Foley & Lardner LLP

(57) ABSTRACT

A video camera system includes a video capture device and a camera controller. The video capture device includes a sensor that receives light, a shutter that selectively permits the light to be received at the sensor based on a shutter speed, and a frame processor that generates a plurality of video frames based on the light. The camera controller includes a frame parameter calculator that calculates a luminance parameter of the plurality of frames, a frequency domain analyzer that executes a frequency domain analysis based on the luminance parameter to generate a plurality of luminance amplitude values mapped to a plurality of frequencies, and a control signal generator that generates a target shutter speed based on the plurality of luminance amplitude values mapped to the plurality of frequencies, and transmits a control signal based on the target shutter speed to cause the shutter to operate at the target shutter speed.

20 Claims, 3 Drawing Sheets

Related U.S. Application Data continuation of application No. 17/536,963, filed on Nov. 29, 2021, now Pat. No. 11,758,281, which is a continuation of application No. 16/156,806, filed on Oct. 10, 2018, now Pat. No. 11,196,940.

(58) Field of Classification Search
USPC .......................................................... 348/226.1
See application file for complete search history.

(56) References Cited

U.S. PATENT DOCUMENTS

| | | | |
|---|---|---|---|
| 2006/0197846 | A1 | 9/2006 | Nose |
| 2007/0085912 | A1 | 4/2007 | Hakola et al. |
| 2010/0157093 | A1 | 6/2010 | Fuchikami et al. |
| 2010/0201866 | A1 | 8/2010 | Jung et al. |
| 2011/0122287 | A1 | 5/2011 | Kunishige et al. |
| 2011/0221930 | A1 | 9/2011 | Katsumata |
| 2012/0057060 | A1 | 3/2012 | Kittaka et al. |
| 2012/0154628 | A1 | 6/2012 | Horiuchi |
| 2013/0342726 | A1 | 12/2013 | Ebina et al. |
| 2015/0195487 | A1 | 7/2015 | Liu et al. |
| 2017/0054890 | A1 | 2/2017 | Wilt et al. |
| 2017/0142315 | A1 | 5/2017 | Tsukagoshi |
| 2018/0041684 | A1 | 2/2018 | Hilldore |
| 2019/0213718 | A1* | 7/2019 | Deng ........................ G06T 5/92 |
| 2019/0253604 | A1* | 8/2019 | Noda ................... H04N 23/667 |

OTHER PUBLICATIONS

Extended Search Report for European Application No. 19155620.8, Aug. 19, 2019, 9 pages.

* cited by examiner

SYSTEMS AND METHODS OF ELIMINATING VIDEO FLICKER CAUSED BY LED DUTY CYCLING TO MAINTAIN BRIGHTNESS AND CONTROL POWER CONSUMPTION

CROSS-REFERENCE TO RELATED APPLICATIONS

The present application is a continuation of U.S. patent application Ser. No. 18/229,438, filed Aug. 2, 2023, which is a continuation of U.S. patent application Ser. No. 17/536,963, filed Nov. 29, 2021, which is a continuation of U.S. patent application Ser. No. 16/156,806, filed Oct. 10, 2018, the disclosure of each of which is incorporated herein by reference in its entirety.

BACKGROUND

Electric light units, such as fluorescent luminaires and other luminaires, may flicker based on a frequency of the mains power supply (e.g., 50 Hz in Europe or 60 Hz in the United States) providing power to such electric light units. Existing video camera systems may have a shutter setting corresponding to the mains power supply frequency to address flicker.

SUMMARY

One implementation of the present disclosure is a video camera system. The video camera system includes a video capture device and a camera controller. The video capture device includes a sensor that receives light, a shutter that selectively permits the light to be received at the sensor based on a shutter speed, and a frame processor that generates a plurality of video frames based on the light received at the sensor. The camera controller receives the plurality of video frames. The camera controller includes a frame parameter calculator that calculates a luminance parameter of the plurality of frames, a frequency domain analyzer that executes a frequency domain analysis based on the luminance parameter to generate a plurality of luminance amplitude values mapped to a plurality of frequencies, and a control signal generator that generates a target shutter speed based on the plurality of luminance amplitude values mapped to the plurality of frequencies, and transmits a control signal based on the target shutter speed to cause the shutter to operate at the target shutter speed.

Another implementation of the present disclosure is a method. The method includes receiving, by a camera controller from at least one video capture device, a video frame, calculating, by the camera controller, a luminance parameter of the video frame, executing, by the camera controller, a frequency analysis to generate a plurality of luminance amplitude values mapped to a plurality of corresponding frequencies, determining, by the camera controller, a target shutter speed based on the plurality of luminance amplitude values mapped to the plurality of corresponding frequencies, and transmitting, by the camera controller, the target shutter speed to a shutter of the at least one video capture device to cause the shutter to operate at the target shutter speed.

Another implementation of the present disclosure is a camera controller. The camera controller includes one or more processors and non-transient computer-readable instructions that when executed by the one or more processors, cause the one or more processors to receive, from at least one video capture device, a video frame, calculate a luminance parameter of the video frame, execute a frequency analysis to generate a plurality of luminance amplitude values mapped to a plurality of corresponding frequencies, determine a target shutter speed based on the plurality of luminance amplitude values mapped to the plurality of corresponding frequencies, and transmit a control signal including the target shutter speed to a shutter of the at least one video capture device to cause the shutter to operate at the target shutter speed.

BRIEF DESCRIPTION OF THE DRAWINGS

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

The present disclosure generally relates to the field of video camera systems, and more particularly to systems and methods of eliminating video flicker caused by light emitting diode (LED) luminaire duty cycling to maintain brightness and control power consumption. Referring generally to the figures, systems and methods in accordance with the present disclosure can effectively address video flicker resulting from the use of LED luminaires. Existing luminaires, such as fluorescent luminaires, flicker in line with the frequency of the mains power supply (e.g., based on the corresponding cyclical fluctuation in current received by the luminaires), this frequency typically being 50 Hz or 60 Hz. As such, existing video camera systems may use a predetermined flicker setting based on knowing the frequency to be either 50 Hz or 60 Hz to avoid the effects of flicker in the captured video stream, such as to execute frame capture during an on part of the cycle of the flickering luminaires. However, LED luminaires do not have to be, and often are not, tied to the frequency of the mains power supply. Rather, flicker and other effects associated with changes in the light outputted by the LED luminaires may result from operation of a controller of the LED luminaires, such as a pulse width modulation (PWM) controller, that drives the LED luminaires to achieve a specific brightness. This does not have to be synchronized to the frequency of the mains power supply, and in fact, the luminaires may be powered by other modalities, such as Power over Ethernet (POE) or direct current (DC) power. This can result in significant flicker in the video that cannot be eliminated by existing 50 Hz/60 Hz settings. In addition, as the location in which the video camera system is operating may have various LED luminaires of different manufacturers and/or being controlled in different manners, it may be difficult to identify a predetermined setting that would universally eliminate flicker from all the LED luminaires (e.g., by simply selecting a different frequency than 50 Hz or 60 Hz).

The present solution can detect and eliminate flicker from LED electric light units by calculating specific parameters regarding the light outputted by the LED electric light units, and appropriately adapting camera operation such as by adapting a shutter rate. For example, systems and methods in accordance with the present disclosure can calculate an average luminosity for each video frame, determine a periodicity and/or frequency of the flicker based on the average luminosity, and adapt a shutter rate of the camera responsive to the periodicity.

Figure 1:
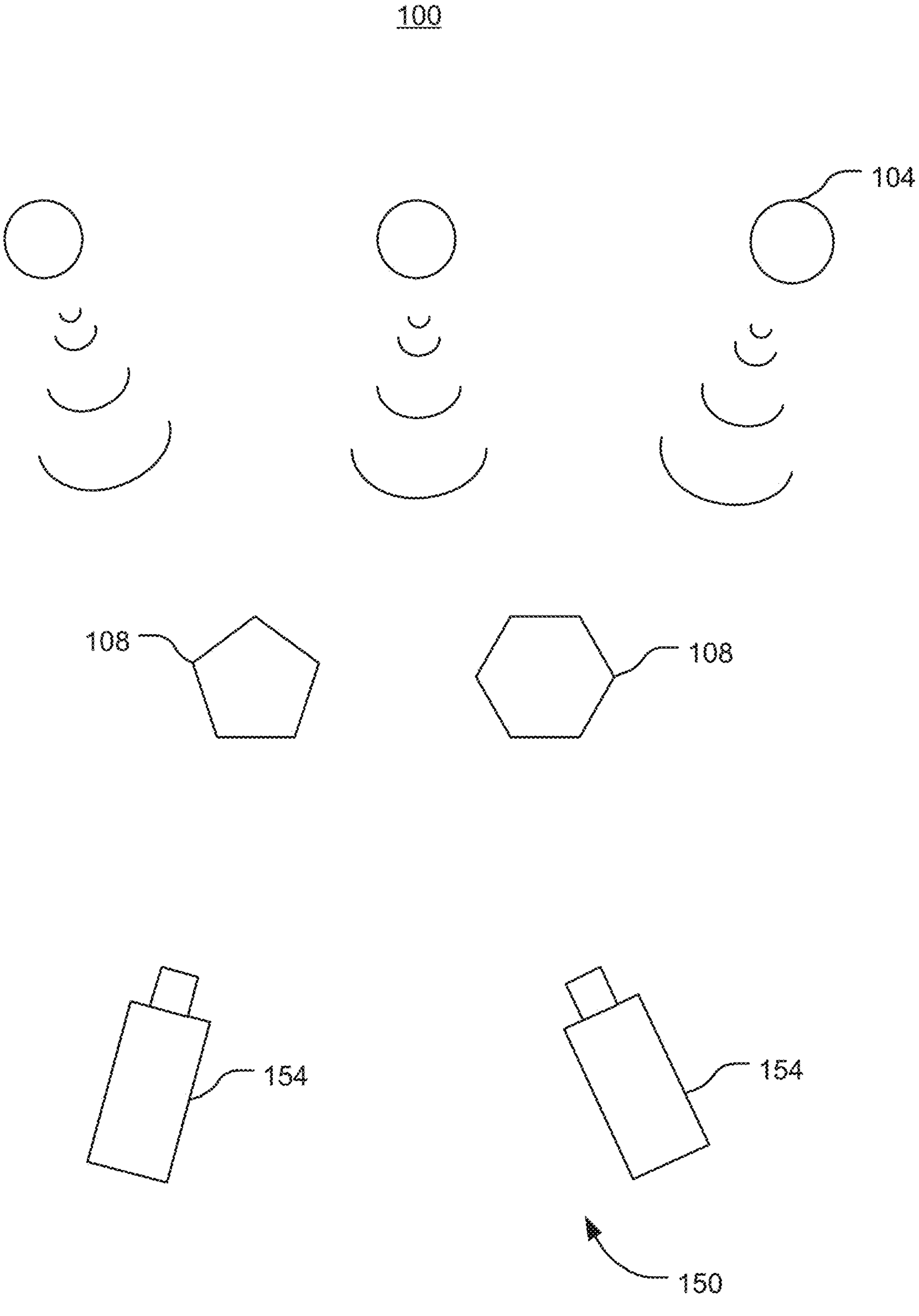
FIG. 1 is a schematic diagram of a video camera environment according to an embodiment of the present disclosure.

Referring to FIG. 1 among others, an environment 100 in which a video camera system 150 operates is depicted. The environment 100 includes one or more electric light units 104. The one or more electric light units 104 may include luminaires. For example, the one or more electric light units 104 can include one or more LED units. The one or more electric light units 104 may also include fluorescent luminaires.

The one or more electric light units 104 output light to illuminate one or more objects 108. The video camera system 150 includes one or more video capture devices 154, which can receive light from a respective field of view (including light received directly from the one or more electric light units 104 and/or reflected by the one or more objects 108), and generate image data (e.g., one or more image frames; a stream of images; video data) based on the received light. In some embodiments, the one or more electric light units 104 may output light characterized by flicker or other changes in brightness as a function of time, which may in turn be captured by the one or more video capture devices 154 and represented in the image and data that the one or more video capture devices 154 generate.

Figure 2:
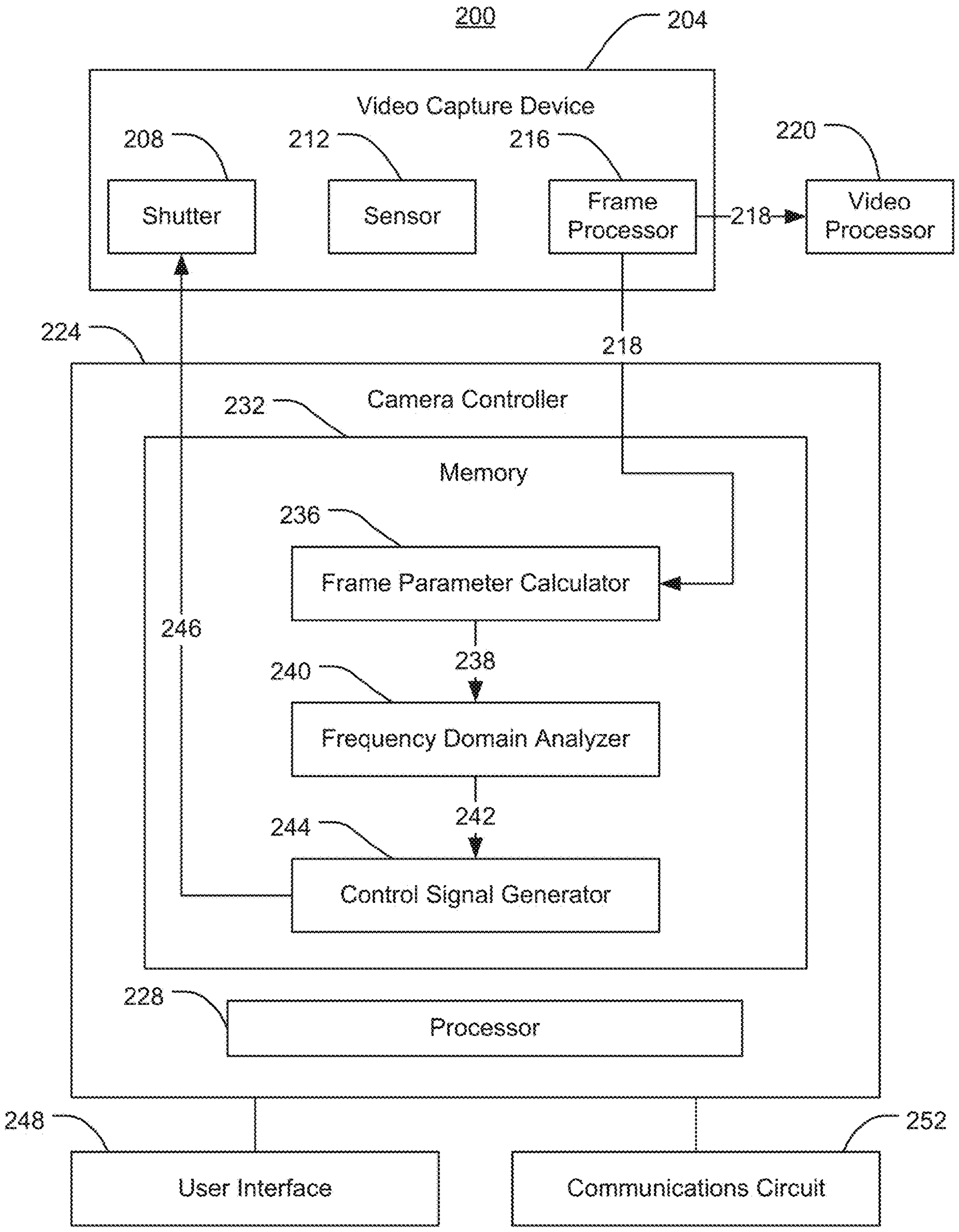
FIG. 2 is a block diagram of a video camera system according to an embodiment of the present disclosure.

Referring now to FIG. 2, a video camera system 200 is depicted. The video camera system 200 can incorporate features of the video camera system 150 described with reference to FIG. 1. The video camera system 200 includes at least one video capture device 204. The at least one video capture device 204 includes a sensor 208, a shutter 212, and a frame processor 216. The sensor 208 detects image and/or video data based on light received by the sensor 208, and outputs the image and/or video data (e.g., outputs a signal representing the image and/or video data) to the frame processor 216. The sensor 208 can including various sensor devices, such as charge coupled device (CCD), complementary metal-oxide-semiconductor (CMOS), or N-type metal-oxide-semiconductor (NMOS) devices. The shutter 212 can be opened and/or closed responsive to a received shutter control signal in order to selectively permit light to be received at the sensor 208. The frame processor 216 can generate one or more video frames 218 (e.g., image frames including a plurality of pixels) representative of the image and/or video data received from the sensor 208. The frame processor 216 can use a clock to assign a timestamp to each generated video frame 218, the timestamp representing a time of capture of the corresponding video frame 218.

The frame processor 216 can output the one or more video frames 218 (e.g., as a video stream) to a video processor 220. The video processor 220 can perform various video processing functions on the received video frames 218, such as to encode the received video frames 218 into a compressed format.

The video camera system 200 includes a camera controller 224 that receives the one or more video frames 218 from the frame processor 216 and can control operation of the at least one video capture device 204 (e.g., control operation of the shutter 212) based on the one or more video frames 218, such as to maintain brightness, control power consumption, and/or eliminate flicker.

The camera controller 224 includes a processor 228 and memory 232. The processor 228 can be a general purpose or specific purpose processor, an application specific integrated circuit (ASIC), one or more field programmable gate arrays (FPGAs), a group of processing components, or other suitable processing components. The processor 228 can execute computer code or instructions stored in memory 232 or received from other computer readable media (e.g., CDROM, network storage, a remote server, etc.).

The memory 232 can include one or more devices (e.g., memory units, memory devices, storage devices, etc.) for storing data and/or computer code for completing and/or facilitating the various processes described in the present disclosure. Memory 232 can include random access memory (RAM), read-only memory (ROM), hard drive storage, temporary storage, non-volatile memory, flash memory, optical memory, or any other suitable memory for storing software objects and/or computer instructions. Memory 232 can include database components, object code components, script components, or any other type of information structure for supporting the various activities and information structures described in the present disclosure. Memory 232 can be communicably connected to processor 228 via camera controller 224 and may include computer code for executing (e.g., by processor 228) one or more processes described herein. When processor 228 executes instructions stored in memory 232, processor 228 generally configures the camera controller 224 to complete such activities.

The camera controller 224 includes a frame parameter calculator 236. The frame parameter calculator 236 calculates at least one parameter 238 regarding the video frame 218. The frame parameter calculator 236 can calculate at least one of a brightness parameter and a luminance parameter of the video frame 218. For example, the frame parameter calculator 236 can calculate an average luminance of the video frame 218, such as by identifying a luminance corresponding to each pixel of the video frame 218 and averaging the identified luminances. The frame parameter calculator 236 may calculate the average luminance as a weighted average, such as by applying greater weights to certain pixels of the video frame 218 relative to other pixels of the video frame 218. The frame parameter calculator 236 can output the at least one parameter 238 together with the timestamp assigned to the video frame 218.

The camera controller 224 includes a frequency domain analyzer 240. The frequency domain analyzer 240 can receive the at least one parameter 238 (and assigned timestamp) from the frame parameter calculator 236, and execute a frequency analysis based on the at least one parameter 238. The frequency domain analyzer 240 can execute the frequency analysis for a duration of time which may be predetermined or adjusted based on user input. In some embodiments, the frequency domain analyzer 240 executes the frequency analysis to generate a plurality of luminance amplitude values mapped to corresponding frequencies 242 at which those luminance amplitude values occur for video frames 218 during the duration of time. For example, given a duration of time of eight seconds and a frame rate of the video frames 218 of twenty four frames per second, the frequency domain analyzer 240 can receive a plurality of video frames 218 from the duration of time (e.g., the one hundred ninety two frames of the eight seconds, each having an average luminance value), and generate a data structure mapping, to each of a plurality of frequencies, a corresponding luminance amplitude value.

The camera controller 224 includes a control signal generator 244. The control signal generator 244 can receive the plurality of luminance amplitude values mapped to corresponding frequencies 242 from the frequency domain analyzer 240, and generate a control signal 246 to control operation of the at least one video capture device 204 using the control signal 246. For example, the camera controller 224 can generate the control signal 246 to control a shutter speed of the shutter 212 of the at least one video capture device 204 to be a target shutter speed. The camera controller 224 can use the control signal 246 to set the target shutter speed to a value that reduces or eliminates luminance variations while maximizing maximum luminance for the resulting video.

In some embodiments, the control signal generator 244 generates the target shutter speed to be a value that corresponds to a highest expected luminance for the video frames 218 based on the plurality of luminance amplitude values mapped to corresponding frequencies 242. For example, the control signal generator 244 can generate the target shutter speed to correspond to a frequency of mapped to the highest luminance amplitude value, or to a multiple or a fraction (e.g., divisor) thereof. For example, the control signal generator 244 can generate the target shutter speed to be equal to the frequency of the highest luminance amplitude value or a multiple or fraction thereof (e.g., if frequency of highest luminance amplitude value is 15 Hz, the shutter speed can be set to 1/15 s, a multiple thereof, such as 1/5 s, or a fraction thereof, such as 1/60 s).

In some embodiments, the control signal generator 244 modifies the targets shutter speed based on at least one of a maximum shutter speed and a minimum shutter speed. For example, the control signal generator 244 can generate an initial target shutter speed based on the plurality of luminance amplitude values mapped to corresponding frequencies 242, compare the initial target shutter speed to the at least one of the maximum shutter speed and the minimum shutter speed, adjust the initial target shutter speed to be equal to the maximum shutter speed if the initial target shutter speed is greater than the maximum shutter speed, and/or adjust the initial target shutter speed to be equal to the minimum shutter speed if the initial target shutter speed is less than the minimum shutter speed. The control signal generator 244 can then generate the control signal 246 using the adjusted target shutter speed.

The control signal generator 244 can iteratively and/or continuously adjust the target shutter speed based on factors representative of flicker in the video frames 218. For example, as the shutter speed of the shutter 212 of each video capture device 204 is modified (based on control signal 246), the plurality of luminance amplitude values mapped to corresponding frequencies 242 will change. As such, the control signal generator 244 can vary the target shutter speed over a plurality of iterations until an iteration condition is satisfied. The iteration condition may be based on a maximum value of a parameter representative of flicker, such as a change or variance of the plurality of luminance amplitude values, so that the control signal generator 244 can vary the target shutter speed until the parameter representative of flicker is less than the maximum value.

The control signal generator 244 can generate the target shutter speed to minimize flicker (e.g., change in luminance). For example, the control signal generator 244 can determine that flicker has not been eliminated based on determining that a change in luminance across cycles (e.g., between consecutive video frames 218; between each iteration of calculating the plurality of luminance amplitude values mapped to corresponding frequencies 242), and adjust the target shutter to minimize the change in luminance and/or reduce the change in luminance to be less than a threshold change in luminance. For example, if there are multiple LED electric light units that have differing flicker frequencies or PWM control schemes, it may be difficult to consistently eliminate flicker; as such, the control signal generator 244 can still control the shutter speed to reduce flicker as much as possible.

In some embodiments, the video camera system 200 includes a user interface 248. The user interface 248 can receive user input and present information regarding operation of the video camera system 200, such as the target shutter speed and the video frames 218. The user interface 248 may include one or more user input devices, such as buttons, dials, sliders, or keys, to receive input from a user. The user interface 248 may include one or more display devices (e.g., OLED, LED, LCD, CRT displays), speakers, tactile feedback devices, or other output devices to provide information to a user.

In some embodiments, the video camera system 200 includes a communications circuit 252. The camera controller 232 can use the communications circuit 252 to communicate with remote entities (including one or more of the at least one video capture device 204 if the camera controller 232 is remote from the one or more of the at least one video capture device 204). The communications circuit 252 can include wired or wireless interfaces (e.g., jacks, antennas, transmitters, receivers, transceivers, wire terminals, etc.) for conducting data communications with various systems, devices, or networks. For example, the communications circuit 252 can include an Ethernet card and port for sending and receiving data via an Ethernet-based communications network. The communications circuit 252 can include a WiFi transceiver for communicating via a wireless communications network. The communications circuit 252 can communicate via local area networks (e.g., a building LAN), wide area networks (e.g., the Internet, a cellular network), and/or conduct direct communications (e.g., NFC, Bluetooth). In some embodiments, the communications circuit 252 can conduct wired and/or wireless communications. For example, the communications circuit 252 can include one or more wireless transceivers (e.g., a Wi-Fi transceiver, a Bluetooth transceiver, a NFC transceiver, a cellular transceiver).

Figure 3:
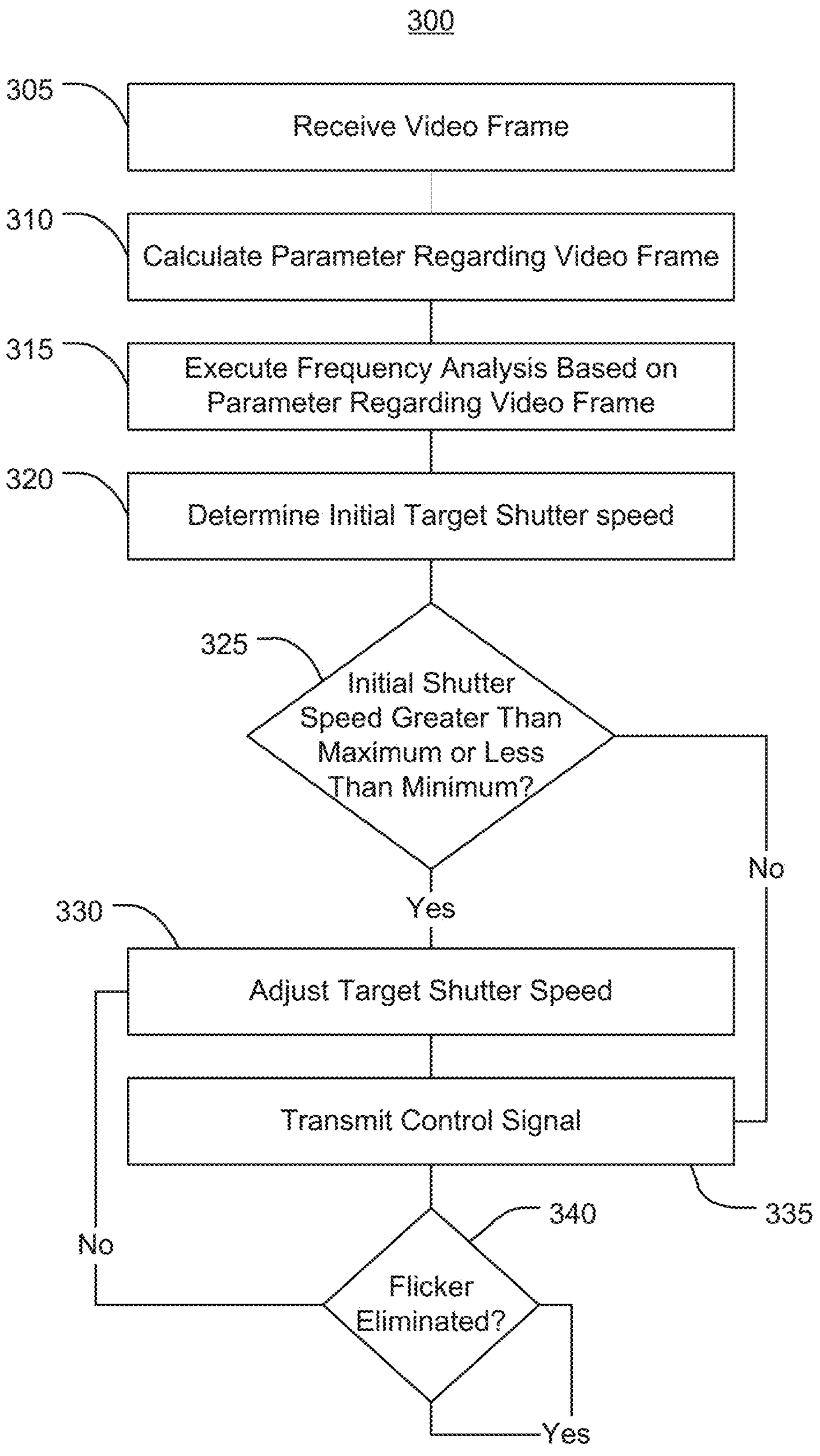
FIG. 3 is a flow diagram of a method of operating a video camera system according to an embodiment of the present disclosure.

Referring now to FIG. 3, a method 300 of operating a video camera system is depicted. The method 300 can be performed using various systems and devices described herein, including the video camera system 200.

At 305, a video frame is received. The video frame may be received by a camera controller. The video frame may be received from at least one video capture device. The video frame may have an assigned timestamp indicating a time at which the video frame was captured. A plurality of video frames may be received over time.

At 310, a parameter regarding the video frame is calculated by the camera controller. The parameter may include at least one of a brightness parameter and a luminance parameter of the video frame. For example, the camera controller can calculate the parameter to include an average luminance by identifying a luminance corresponding to each pixel of the video frame and averaging the identified luminances.

At 315, a frequency analysis is executed based on the parameter regarding the video frame by the camera controller. The frequency analysis can be executed based on a plurality of values of the parameter regarding the video frame for a duration of time. The camera controller can execute the frequency analysis to generate a plurality of luminance amplitude values mapped to corresponding frequencies at which those luminance amplitude values occur for video frames during the duration of time.

At 320, an initial target shutter speed is determined based on the frequency analysis by the camera controller. Generating the initial target shutter speed can include identifying at least one of a frequency mapped to a highest luminance amplitude value of the plurality of luminance amplitude values, a multiple of the frequency mapped to the highest luminance amplitude value, and a fraction of the frequency mapped to the highest luminance amplitude value.

At 325, the initial target shutter speed is compared to at least one of a maximum shutter speed and a minimum shutter speed by the camera controller. If the initial shutter speed is greater than the maximum shutter speed or less than the minimum shutter speed, then at 330, the camera controller can adjust the target shutter speed. For example, the camera controller can adjust the target shutter speed to be equal to the maximum shutter speed if the initial target shutter speed is greater than the maximum shutter speed, and can adjust the target shutter speed to be equal to the minimum shutter speed if the initial target shutter speed is less than the maximum shutter speed.

At 335, the camera controller transmits a control signal generated based on the target shutter speed to the video capture device to cause the at least one video capture device to operate at the target shutter speed. For example, the camera controller can use the control signal to cause a shutter of the at least one video capture device to operate at the target shutter speed.

At 340, the camera controller can evaluate a flicker parameter, such as change in luminance, to determine whether the flicker has been eliminated. For example, the camera controller can compare the flicker parameter to a maximum flicker parameter threshold and determine that flicker has been eliminated responsive to the flicker parameter being less than the maximum flicker parameter threshold. Responsive to determining that flicker has been eliminated, the camera controller can maintain operation at the target shutter speed, such as by discontinuing transmission of the control signal, continuing to transmit the control signal at the target shutter speed, and/or continuing to evaluate the flicker parameter (e.g., FIG. 3 depicts the camera controller continuing to evaluate the flicker parameter). Responsive to determining that flicker has not been eliminated, the camera controller can adjust the target shutter speed.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system, comprising one or more processors to:

determine a first luminance of a first frame of a plurality of frames;

compare the first luminance of the first frame with a second luminance of a second frame of the plurality of frames to determine a highest expected luminance;

determine a target shutter speed for a shutter of a video capture device based on the highest expected luminance;

determine that a change in luminance between consecutive frames of the plurality of frames is greater than a threshold change in luminance, responsive to the target shutter speed being less than a minimum shutter speed; and provide instructions to adjust the target shutter speed to an adjusted target shutter speed.

2. The system of claim 1, comprising:
the one or more processors to identify a luminance corresponding to each pixel of the first frame of the plurality of frames.

3. The system of claim 1, comprising:
the one or more processors to generate an initial target shutter speed based on a plurality of luminance amplitude values.

4. The system of claim 1, comprising:
the one or more processors to determine the second luminance of the second frame of the plurality of frames.

5. The system of claim 1, comprising:
the one or more processors to determine the target shutter speed for the shutter of the video capture device based on a frequency corresponding to the highest expected luminance.

6. The system of claim 1, comprising:
the one or more processors to determine that flicker has not been eliminated based on a change in luminance between the first luminance of the first frame and the second luminance of the second frame.

7. The system of claim 1, comprising:
the one or more processors to provide the instructions to adjust target shutter speed to reduce a change in luminance between the first luminance of the first frame and the second luminance of the second frame to a value less than a threshold change in luminance.

8. The system of claim 1, comprising:
a communications circuit to communicate with a remote device.

9. The system of claim 1, comprising:
the one or more processors to provide the instructions to adjust the target shutter speed for display by a user interface.

10. The system of claim 1, comprising:
the video capture device to generate the plurality of frames, the video capture device including the shutter, the shutter configured to permit light to be received to generate the plurality of frames.

11. The system of claim 1, comprising:
the one or more processors to cause the shutter to operate at the target shutter speed.

12. The system of claim 1, wherein the first luminance is an average luminance of the first frame and the second luminance is an average luminance of the second frame.

13. The system of claim 1, comprising:
the one or more processors to determine at least one of a periodicity or a frequency of a flicker in the plurality of frames.

14. The system of claim 1, comprising:
the one or more processors to determine an initial target shutter speed based on frequency analysis of the first luminance of the first frame.

15. The system of claim 1, comprising:
the plurality of frames based on light from a plurality of luminaires having differing flicker frequencies or pulse width modulation (PWM) control schemes.

16. A method, comprising:
determining, by one or more processors, a first luminance of a first frame of a plurality of frames;
comparing, by the one or more processors, the first luminance of the first frame with a second luminance of a second frame of the plurality of frames to determine a highest expected luminance;
determining, by the one or more processors, a target shutter speed for a shutter of a video capture device based on the highest expected luminance;
causing, by the one or more processors, the shutter to operate at a target shutter speed responsive to the at least one luminance parameter;
determining, by the one or more processors, that a change in luminance between consecutive frames of the plurality of frames is greater than a threshold change in luminance;
adjusting, by the one or more processors, the target shutter speed to determine an adjusted target shutter speed responsive to determining that the change in luminance is greater than the threshold change in luminance; and
causing, by the one or more processors, the shutter to operate at the adjusted target shutter speed.

17. The method of claim 16, comprising:
determining, by the one or more processors, the target shutter speed for the shutter of the video capture device based on a frequency corresponding to the highest expected luminance.

18. The method of claim 16, comprising:
adjusting the target shutter speed responsive to the target shutter speed being less than a minimum shutter speed.

19. The method of claim 16, comprising:
identifying a luminance corresponding to each pixel of the first frame of the plurality of frames.

20. The method of claim 16, comprising:
providing, by the one or more processors, an instruction to adjust the target shutter speed to reduce the change in luminance to be less than the threshold change in luminance.

* * * * *